United States Patent [19]

Hirschbuehler et al.

[11] Patent Number: 4,539,253

[45] Date of Patent: Sep. 3, 1985

[54] HIGH IMPACT STRENGTH FIBER RESIN MATRIX COMPOSITES

[75] Inventors: Kevin R. Hirschbuehler, Bel Air; Bruce A. Stern, Fallston, both of Md.

[73] Assignee: American Cyanamid Co., Stamford, Conn.

[21] Appl. No.: 595,314

[22] Filed: Mar. 30, 1984

[51] Int. Cl.[3] ............... B32B 27/08; B32B 27/30; B32B 27/38; B32B 31/08; B32B 31/12

[52] U.S. Cl. ............... 428/229; 156/175; 156/307.1; 156/307.3; 156/307.4; 156/307.5; 244/119; 273/DIG. 3; 273/DIG. 7; 273/DIG. 10; 273/DIG. 23; 428/236; 428/248; 428/251; 428/252; 428/285; 428/286; 428/287; 428/302; 428/408; 428/902

[58] Field of Search ............... 428/229, 236, 248, 251, 428/252, 285, 286, 287, 302, 408, 902; 156/175, 307.1, 307.3, 307.4, 307.5

[56] References Cited

U.S. PATENT DOCUMENTS

| | | |
|---|---|---|
| 2,561,449 | 7/1951 | Ruderman . |
| 2,810,674 | 10/1957 | Madden . |
| 3,010,848 | 12/1961 | Rochas . |
| 3,472,730 | 10/1969 | Frigstad . |
| 3,649,435 | 3/1972 | Varlas . |
| 3,755,061 | 8/1973 | Schurb . |
| 3,914,494 | 10/1975 | Pork . |
| 4,182,495 | 1/1980 | Borgimeier et al. . |
| 4,309,473 | 1/1982 | Minamisawa et al. . |
| 4,343,843 | 8/1982 | Johnson et al. . |
| 4,446,255 | 5/1984 | Ying et al. . |

FOREIGN PATENT DOCUMENTS 1182377 2/1970 United Kingdom .

*Primary Examiner*—James C. Gannon
*Attorney, Agent, or Firm*—William H. Calnan

[57] ABSTRACT

Improved fiber resin matrix prepreg fabrics are disclosed which are comprised of a first layer of reinforcing fabric coated with an epoxy resin composition and a discrete second layer of an epoxy resin modified with an elastomeric polymer. The discrete second layer is provided with a support comprising a gauze-like, lightweight fibrous mat or carrier of lightweight fibers that preserves the second "interleaf" layer during cure. Cured composites having the continuous interleaf layer intact exhibit high impact strength and resistance to impact damage.

29 Claims, 4 Drawing Figures

HIGH IMPACT STRENGTH FIBER RESIN MATRIX COMPOSITES6

BACKGROUND OF THE INVENTION

This invention relates to interleafed fiber resin matrix materials. More particularly, the invention relates to improved interleafed fiber resin matrix fabric sheeting having high impact strength.

High strength to weight materials constructed from fiber resin matrix composites have become widely used in many industries where strength, corrosion resistance and light weight are desirable. For example, resin matrix materials are particularly well suited for use in aircraft structural members. Sporting equipment, such as tennis rackets and golf clubs, has also been successfully constructed from such materials.

Improved composites having high impact strength and resistance to impact damage are described in commonly assigned, copending U.S. application Ser. No. 572,263, filed Jan. 19, 1984, which is hereby incorporated by reference. Bi-layer composites are described therein which comprise (A) a fiber resin matrix layer of high-strength reinforcing filaments coated with a thermosetting epoxy resin and (B) a discrete interleaf layer of modified thermosetting epoxy resin, containing a rubbery, extensible polymer material. The composites are commonly formed into prepreg tapes, wherein the filaments are arranged in a flat, unidirectional array, and the tapes used to build, or "lay-up", a structural laminate, where the interleaf layers provide special advantages in terms of shear and impact strength.

When the reinforcing filaments are in the configuration of a fabric, however, great difficulty has been encountered in maintaining a continuous interleaf layer. When the bi-layer prepreg fabrics are laminated and cured under pressure, the thin interleaf resin layer is broken up, largely eliminating any improvements in performance. This is at least partially due to the construction of reinforcing fabrics: Fiber bundles, or "tows", of about 1.000 to 12,000 individual fibers are interwoven to form a high-strength fabric sheet, which is in turn coated and impregnated with thermosetting resin. On a microscopic level, the surface of such a fabric is very uneven and a thin interleaf layer, when pressed between fabric sheets and cured, is easily disrupted.

Attempting to preserve the interleaf layer by changing the curing process or radically altering the interleaf layer are imperfect solutions: Changes in the curing conditions or chemistry increases the cost, time and expertise required and often result in inferior composites; applying a thicker layer of interleaf resin or reinforcing it also adds cost but also, and much more importantly, abrogates the high strength-to-weight ratio that gives fiber resin matrix materials their advantage over metals.

SUMMARY OF THE INVENTION

It has now been discovered that incorporating a thin, non-woven or woven fibrous mat or carrier into the elastomeric interleaf resin layer sufficiently supports the interleaf during cure to provide a fiber resin matrix prepreg fabric having significantly increased impact resistance, without significantly adding to the gross weight of the final composite. The non-woven or woven fibrous mat or carrier comprising, e.g., lightweight glass, polyester, graphite, carbon, boron, polyaramide, cellulosic, etc. fibers, does not reinforce the interleaf or add strength to the ultimate composite, rather it supports the interleaf resin during cure, providing a final interleaf layer that is continuous and integral. The preserved continuous interleaf layer in turn provides finished composites having greater impact strength and resistance to delamination after impact damage.

Accordingly, it is an object of the present invention to provide an interleafed fiber resin matrix prepreg fabric exhibiting improved impact resistance, or "toughness", over known prior art resin matrix materials.

It is a further object of the present invention to provide a cured interleafed fabric resin matrix composite having continuous, integral interleaf resin layers.

It is a further object of the present invention to provide a method for producing interleafed fiber resin matrix prepreg fabric having a discrete, integral resin interleaf layer and exhibiting improved impact strength after cure.

These and other objects are accomplished herein by a method for producing an interleafed prepreg fabric comprising (1) incorporating a lightweight fibrous mat or carrier of supporting filaments into an interleaf resin composition comprising (a) a first thermosetting epoxy resin composition containing (b) about 8% to 70% by weight of a rubbery vinyl addition polymer to provide a supported interleaf resin layer, and (2) introducing said supported interleaf resin layer to at least one surface of a fiber resin matrix comprising (a) a fabric of high-strength reinforcing filaments and (b) a second thermosetting epoxy resin composition.

Also contemplated are prepreg fabrics comprising (A) a fiber resin matrix layer comprising (i) interwoven high-strength reinforcing filaments and (ii) a thermosetting epoxy resin composition coating said interwoven reinforcing filaments, and (B) a discrete interleaf resin layer comprising (i) a lightweight fibrous mat or carrier of supporting filaments and (ii) a modified thermosetting epoxy resin composition containing from about 8% to 70% by weight of a rubbery vinyl addition polymer.

Figure 1:
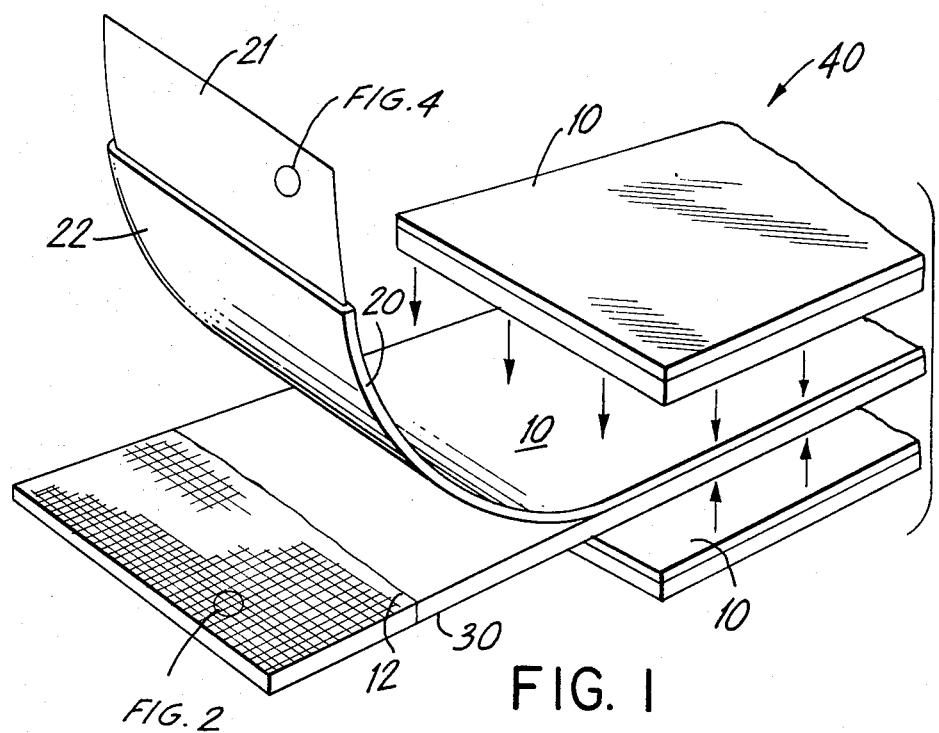
FIG. 1 is an enlarged elevational exploded view of an interleafed prepreg fabric composite according to the present invention, showing separate fiber resin matrix and interleaf lamina, and the components of individual lamina, including a reinforcing fabric, a resin matrix covering said fabric, a discrete interleaf layer of elastomeric resin, and a lightweight fibrous mat or carrier incorporated in said interleaf layer.

As used herein, the term "mat" generally denotes a non-woven fibrous film, and the term "carrier" generally denotes woven such films. The collective term "fibrous mat or carrier" is intended to cover a wide range of lightweight non-woven and woven films capable of supporting (and not necessarily reinforcing) the interleaf resin layer during curing, as will be described in more detail below.

DESCRIPTION OF THE PREFERRED EMBODIMENTS

The present invention is directed to the provision of a laminate layer referred to as an interleaf for use in a composite structure of a fiber resin matrix and the interleaf.

The fundamental discovery underlying the present invention is that a resin having particular mechanical properties, when used to provide thin, discrete layers between reinforcing fabric layers of a fiber resin matrix fabric composite, results in a composite having unique toughness, shear resistance, and resistance to impact damage, and these properties are exhibited over a broad range of temperatures, e.g., from −67° F. to 200° F. This performance is achieved by pairing a matrix resin having particular high-temperature properties and an interleaf resin having some elastomeric properties to form a composite structure of alternating fabric and interleaf layers.

Thus, the invention further resides in the fact that resins have been developed that are well suited for use as particular interleaf materials to provide a fiber resin matrix and interleaf resin composite of superior toughness.

It is particularly significant in this invention that the interleaf material contains a quantity of rubbery (elastomeric) material and that the interleaf resin and the resin of the fiber resin matrix be sufficiently compatible to form strong cross-links across the resin interface; yet, the interleaf material must be capable of being viscosity controlled to prevent intermixing, and a discrete interleaf layer must be achieved.

It has been discovered that the interleafed composites of the present invention, besides exhibiting the high compression, tensile and flexural strengths characteristic of fiber resin matrices, also exhibit an unexpected ability to withstand impact damage, and over a wide range of temperatures (e.g., samples are tested at from −67° F. to +20° F.). The interleafed composites of the present invention for example, show greater toughness, greater resistance to shear impact, greater tolerance of impact damage and greater resistance to crack propagation than conventional fiber resin matrix composites.

The dynamic relationship between the fiber resin matrix component and the interleaf resin component of the present composites is complex, however in general the interleaf resin provides toughness, i.e., high impact strength, to the composite at all temperatures, while the matrix resin is highly resistant to the effects of wet conditions and changes in temperature. The interleaf resin layers are also designed to protect the fiber matrix layers by absorbing or otherwise "heading off" damaging forces before they reach levels harmful to the fiber resin matrix. When subjected to shear forces, for instance, the interleaf materials suitable for the purposes herein show great elongation above a certain shear stress level, and the components are paired so that the interleaf resin layer will flex and absorb the energy of the shear load as it approaches a level at which the fiber resin matrix will fail. If impact loads reach such levels that the structure cracks, the high strain capabilities of the interleaf layer help to maintain the integrity of the structure by increasing the energy required to drive cracks through the laminate. In this way crack propagation, even after damage, is curtailed; and by selecting the components to provide this sort of interprotective relationship, highperformance composites can be achieved.

The reinforcing filaments useful in the present invention include, but are not limited to, filaments comprised of glass, carbon, graphite, silicon carbide, boron, polyaramide, polyester, polyamide, rayon, polybenzimidazole, polybenzothiazole, metal-coated such filaments, for example nickel-coated and/or silver-coated graphite fibers and filaments, or combinations of such filaments. In applications demanding a high strength to weight ratio or shear strength, carbon fibers, graphite filaments, such as disclosed in commonly assigned, co-pending U.S. application Ser. No. 358,637, filed Mar. 3, 1982, and now abandoned, are preferred.

As discussed in referring to the drawings, above, individual reinforcing filaments are gathered in bundles, or tows, of approximately 1,000 to 12,000 filaments each and the tows are interwoven to form a flexible, strong fabric. Although reinforcing fabrics may appear to have a smooth surface, on a microscopic level the woven surface of the fabric is sufficiently irregular to disrupt the thin (e.g., about 0.0005 to 0.003 inch thick) interleaf layer under common curing conditions.

The epoxy resin composition used to coat the reinforcing filaments (matrix resin) is comprised primarily of epoxy compounds having more than one epoxide group per molecule available for reaction. Such epoxy prepolymers include, but are not limited to, polyfunctional ethers of polyvalent phenols, for example pyrocatechol; resorcinol; hydroquinone; 4,4'-dihydroxydiphenyl methane; 4,4'-dihydroxy-3,3'-dimethyldiphenyl methane; 4,4'-dihydroxydiphenyl dimethyl methane; 4,4'-dihydroxydiphenyl methyl methane; 4,4'-dihydroxydiphenyl cyclohexane; 4,4'-dihydroxy-3,3 ' -dimethyldiphenyl propane; 4,4'-dihydroxydiphenyl sulphone; or tris-(4-hydroxyphenyl) methane; polyglycidyl ethers of the chlorination and bromination products of the above-mentioned diphenols; polyglycidyl ethers of novolacs (i.e., reaction products of monohydric or polyhydric phenols with aldehydes, formaldehyde in particular, in the presence of acid catalysts); polyglycidyl ethers of diphenols obtained by esterifying 2 mols of the sodium salt of an aromatic hydroxycarboxylic acid with 1 mol of a dihalogenoalkane or dihalogen dialkyl ether (see, U.K. No. 1,017,612); and polyglycidyl ethers of polyphenols obtained by condensing phenols and long-chain halogen paraffins containing at least 2 halogen atoms (see, U.K. No. 1,024,288).

Other suitable compounds include polyepoxy compounds based on aromatic amines and epichlorohydrin, for example N,N'-diglycidylaniline; N,N'-dimethyl-N,N'-diglycidyl-4,4'-diaminodiphenyl methane; N-diglycidyl-4-aminophenyl glycidyl ether; N,N,N',N'-tetraglycidyl-4,4'-diaminodiphenyl methane; and N,N,N',N'-tetraglycidyl-1,3-propylene bis-4-aminobenzoate, the latter two compounds being most preferred.

Glycidyl esters and/or epoxycyclohexyl esters or aromatic, aliphatic and cycloaliphatic polycarboxylic acids, for example phthalic acid diglycidyl ester and adipic ester diglycidyl and glycidyl esters of reaction products of 1 mol of an aromatic or cycloaliphatic dicarboxylic acid anhydride and ½ mol of a diol or 1/n mol of a polyol with n hydroxyl groups, or hexahydrophthalic acid diglycidyl esters, optionally substituted by methyl groups, are also suitable.

Glycidyl ethers of polyhydric alcohols, for example of 1,4-butanediol; 1,4-butenediol; glycerol; 1,1,1-trimethylol propane; pentaerythritol and polyethylene glycols may also be used. Triglycidyl isocyanurate; and polyglycidyl thioethers of polyvalent thiols, for example of bis mercaptomethylbenzene; and diglycidyl-trimethylene sulphone, are also suitable.

The epoxy resin composition will also include a curing agent for the epoxy resin. Such curing agents are well known to those skilled in the art, and preferred curing agents for the purposes herein will be diamines, including, but not limited to, diaminodiphenyl sulphone, diaminodiphenyl methane, phenylenediamine, etc.

The amount of curing agent necessary for a particular application can be readily determined by persons skilled in the art and will vary according to the precise makeup of the resin composition, the curing conditions desired and other factors. However, by way of illustration, where a diamine curing agent is employed, from about 20 to 40 weight percent, most preferably about 27 to 31 weight percent, based on the total epoxy resin, has been found suitable.

Fillers, dyes, pigments, plasticizers, curing catalysts and other such conventional additives and processing aids may be added to the epoxy resin compositions described herein before curing to influence the properties of the final resin composite.

The modified heat-curable epoxy resin of the interleaf layer comprises 30% by weight or more epoxy resin composition and from about 8% to 70% by weight of a rubbery vinyl addition polymer. The suitable epoxy resins (and curing agents) are of the same type disclosed above, although the particular epoxy resin employed in the interleaf will typically be a different resin than that selected for use in the fiber resin matrix layer.

The rubbery vinyl addition polymers contemplated herein include homopolymeric and copolymeric diene rubbers, derived from conjugated dienes of 4 to 8 carbons such as butadiene, isoprene, propylene, chloroprene, and the like. These include but are not limited to copolymers of such dienes with each other and with one or more of such monomers as styrene, acrylonitrile, methacrylonitrile, acrylic acid, methacrylic acid, methyl methacrylate, and the like. Butadiene-acrylonitrile polymers and carboxylic-functional butadiene-acrylonitrile polymers are most preferred.

The amount of rubbery modifier present can vary from 8 to 70 weight percent, and the specific amounts employed must be sufficient to impart elasticity and toughness to the interleaf resin. Preferably, about 8 to 24 weight percent of the modifier will be used; and where the preferred butadiene-acrylonitrile copolymers are employed, a level of about 10 to 15 weight percent is most preferred.

Suitable supporting fibers for use in the non-woven or woven fibrous mat or carrier are selected for their ability to preserve the continuity of the interleaf layer during the curing process, and accordingly the fibers must survive the curing temperatures, e.g., 350° F., without disintegrating. Beyond this requirment, the primary factor influencing selection of the most appropriate fibrous mat or carrier is weight. The lightweight fibrous mat or carrier must add as little weight as possible to the final prepreg sheet, preferably less than 5%.

Lightweight fibrous mats and carriers of lightweight glass, carbon, graphite, boron, polyaramide, polyethylene, polyester, and cellulosic fibers, and the like, are contemplated, so long as they provide sufficient support during cure to preserve the resin interleaf layer. Non-woven fibrous mats are generally preferred over woven carriers of the same material, since the mat or carrier will normally weigh much less than the woven carrier, however where a woven support will serve the purposes described herein without disadvantageously increasing the weight of the final prepreg, it is entirely acceptable. Mats of spun polyester fibers are most preferred.

The physical properties of the interleaf resin composition are not affected by the presence of the lightweight fibrous mats or carrier. The physical strength of the mat or carrier is almost insignificant compared to that of the cured resin, and for that reason the fibrous mat or carrier is not thought of in the art as "reinforcing" the interleaf layer.

The bi-layered prepreg fabric sheeting of the invention is prepared by methods well known in the art. Typically, the high-strength reinforcing fabric is dipped over tension rollers in an epoxy resin composition dispersed in solvent, then introduced through wiping rollers to control the resin content, e.g., to about 30% to 60% by weight, preferably 40% to 45%. The resin-coated fabric is passed through a drying tower to remove solvent, then introduced through a laminator, where it is mated with release paper coated with the modified interleaf resin. The fibrous mat or carrier is most easily introduced after the mating of the layers, by being wound into the interleaf layer before the interleaf resin dries. As soon as the resins are sufficiently dry to be handled, the bi-layer prepreg fabric is wound on a spool or otherwise conventionally stored for use in constructing high-strength composite structures.

The viscosity of the interleaf resin must be sufficiently high to provide the interleaf with the necessary toughness and to maintain the interleaf resin as a discrete layer adjacent to the fabric resin matrix. As previously mentioned, however, crosslinking at the interface between the two resin layers is desireable (and most preferred). This condition will occur when the resin of the interleaf is chemically compatible with the resin of the fiber resin matrix, so as to promote cross-linking, and loaded with the necessary amount of elastomeric (rubbery) material to define a discrete interleaf layer.

It has been observed that the resin of the interleaf containing the necessary amount of modifier will have a Flow Test Number (flow percent), N, measuring less than about 12 from the following viscosity test:

FLOW (VISCOSITY) TEST

1. Prepare a laminate by coating 0.02 pounds per square foot on interleaf resin onto 120 glass fabric.
2. Stack four, 4"×4" square plies of the laminate.
3. Weigh the uncured 4-ply stack.
4. Cure the stack at 325° F. 60 psi for 15 minutes.
5. Trim all resin that is squeezed beyond the edge of the 120 glass fabric during the curing step (4).
6. Weigh the cured, trimmed stack.
7. Obtain the flow percentage, N, as follows:

$$N = \frac{\text{(weight of uncured stack)} - \text{(weight of trimmed, cured stack)}}{\text{(weight of uncured stack)}} \times 100$$

A flow percent N below about 12 is required for optimal performance under this invention and preferably the N flow number will be between 5.5 and 7.7. Also, experimental data indicate that poor interleaf material is obtained when the N flow number is above about 14.6.

In addition to the flow characteristics of a resin, an indication of the perfomance of laminated fiber resin matrix composites can be gained by subjecting cured samples of the resins to shear forces, and measuring the elongation (in inches) as a function of applied force (in lbs). The data from this test may be plotted, which typically generates a curve that ends at the point of applied force and elongation where the sample breaks. From this curve, the shear strain and shear stress of the resins can be calculated and the characteristic stress/strain curves plotted. The testing procedure is described more fully in Krieger, Jr., R.B., "Stiffness Characteristics of Structural Adhesives For Stress Analysis in Hostile Environment," American Cyanamid Co., Bloomingdale Plant, Havre de Grace, Md. (May, 1979), incorporated herein by reference.

When the fiber resin matrix and interleaf resin are properly matched according to the present invention, the shear stress/strain curves at various temperatures for the matrix resin and the interleaf resin show high modulus and other properties (yield, strain to failure, ultimate stress), discussed in more detail below.

In practice, the interleaf material of this invention can be used to form a variety of different parts. For example, cover structures for airplane parts may be formed of fiber resin matrix-interleaf sheets stacked and cured to form 0.10-inch to 0.25-inch thin structural parts, for example wing and fuselage components. The fabric sheeting of this invention is suitable for primary structures having the highest performance requirements.

The fiber resin matrix-interleaf fabric sheets range in thickness from 0.005 to 0.04 inch, the thickness varying according to resin content, type of fabric used, fiber count, etc. The fiber resin matrix-interleaf fabric sheets are also commonly laminated with the direction of the fabric weave oriented in different directions, e.g., 0° and 45° relative, depending on the stress requirements of the part.

The relative thickness of the layers of the fiber resin matrix-interleaf resin sheet is also important. Preferably the discrete, mat- or carrier-supported interleaf layer will be in the range of about 0.0005 in. to 0.003 in. (or about 0.0004 to 0.03 pounds/square foot, most preferably 0.01 to 0.018 pounds/square foot), and the fabric resin matrix layer will be in the range of about 0.005 in. to 0.014 in.

It has been discovered that in order to provide the unique advantages of the present invention, the epoxy resin compositions, that is, the matrix resin (which coats the reinforcing filaments) and the interleaf resin, must exhibit specific properties. The matrix resin, when tested "neat", or without reinforcement, must show a minimum stiffness when subjected to shear forces, especially at high temperatures and under wet conditions. The matrix resin must have a shear modulus of at least 90,000 psi under hot, dry conditions, e.g., when subjected to shear at 200° F., or a shear modulus of at least 50,000 psi under hot, wet conditions, e.g. when subjected to shear at 200° F. after soaking in water for 14 days. It is also necessary that the matrix resin have a shear modulus above about 100,000 at room temperature and extremely low temperatures, i.e., −67° F., however, this is ordinarily the case where the modulus at 180°–200° F. is as high as 50,000 psi. Preferred matrix resin compositions will show an initial shear modulus of 90,000 psi or above under hot, wet conditions, and will show an initial shear modulus of 130,000 psi or above at room temperature and low temperatures. The most preferred epoxy resins for use as a matrix resin will also exhibit high strength, for example an ultimate stress over 3000 psi, most preferably 5000 psi or above.

The interleaf resin must also exhibit a minimum initial shear modulus, and in addition the interleaf resin must show elongation above a minimum stress. This initial modulus is believed to transfer loads between the layers of the reinforcing fibers without large deformation of the structure. For the purposes herein, the interleaf material must have an initial shear modulus above 50,000 psi at high temperatures, preferably above 90,000 psi at 200° F. At room temperature the initial shear modulus for the interleaf should be at least about 100,000 psi (preferably at least 130,000 psi), and at −67° F. the shear modulus should be at least about 130,000 psi (preferably at least 150,000 psi); however, as with the matrix resin, such values at room temperature and low temperatures would be expected with high shear modulus at elevated temperatures.

The interleaf resin shows an initial rigidity (high modulus) when subjected to shear but at a certain level of shear stress, shows elongation (high ultimate strain). The point at which the resin begins to show high elongation in response to stress is the yield strength of the resin, and for the purposes herein, this must be at least about 3000 psi at high temperatures. The yield strength for the interleaf resin should be at least about 5000 psi at room temperature; and at −67° F., where there is ordinarily no definite "knee" or yield point, the ultimate stress (stress at failure) should be about 6000 psi or above. Most preferred interleaf resins will have a room temperature yield strength of at least about 6000 psi and a high temperature yield strength of at least about 5000 psi.

The degree of elongation after reaching the yield point is also important. The interleaf resin must have an overall elongation or strain to failure of at least 6%, preferably 9%, at −67° F., and a strain to failure at room temperature of at least about 15%, preferably 25% or greater. This property is less important at elevated temperatures, but preferred interleaf resins will have a strain to failure of over 20%, most preferably over 50% at 200° F.

The general configuration of a fiber resin matrix fabric prepreg according to the present invention is illustrated in the drawings. As seen in FIG. 1, the bi-layer prepreg fabric sheet 10 of the invention is comprised of two layers: A fiber resin matrix layer 30 and a thin interleaf layer 20. The fiber resin matrix 30 is comprised of a fabric 11 made of interwoven tows of bundled high-strength reinforcing filaments, and fabric 11 is coated and impregnated with a thermosetting epoxy resin composition 12. Adjacent said fiber resin matrix layer 30 is interleaf layer 20, comprising a modified epoxy resin composition 22 (containing a rubbery vinyl addition polymer) supported by fibrous mat or carrier 21 made of lightweight supporting fibers.

Figure 2:
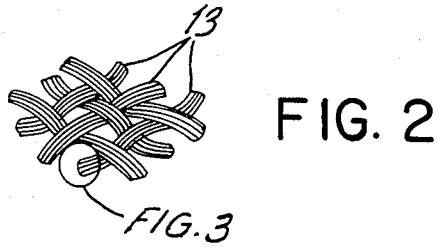
FIG. 2 is a magnified detail of the reinforcing fabric of FIG. 1, showing the interwoven tows of reinforcing filaments.
Figure 3:
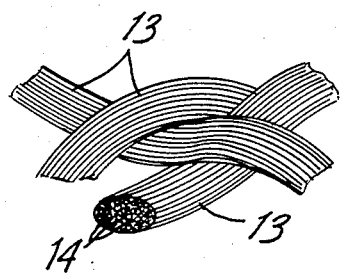
FIG. 3 is a magnified sectional view of a tow of FIG. 2, showing the individual reinforcing filaments, numbering approximately 1,000 to 12,000, which make up each tow.

FIG. 2 illustrates the structure of fabric 11, wherein tows 13 are interwoven to form a high-strength fabric sheet. FIG. 3 illustrates the construction of tows 13 from bundles of individual reinforcing filaments 14, numbering approximately 1,000 to 12,000 per tow 13.

Figure 4:
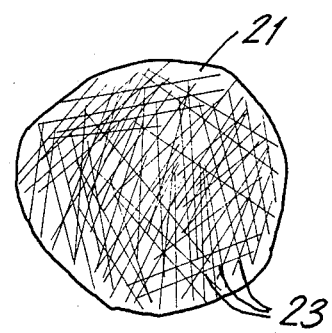
FIG. 4 is a magnified detail of a lightweight fibrous supporting mat, showing the random configuration of lightweight supporting filaments. The preferred non-woven fibrous mat is shown in this figure, but it should be noted that woven lightweight supporting carriers, formed from interwoven lightweight supporting filaments, may also be used to support the interleaf layer.

The general configuration of the non-woven or woven fibrous mat or carrier 21 that supports the modified resin composition 22 of interleaf layer 20 is detailed in FIG. 4, wherein the non-woven, random arrangement of the lightweight supporting fibers 23 is shown.

Bi-layered sheets 10 are typically stacked to form a prepreg laminate which is, in turn, shaped and cured to provide high performance fabric resin matrix composites, that is, fiber resin matrix composites wherein the reinforcing fiber matrix is in the configuration of a high-strength woven fabric.

In order that those skilled in the art may better understand the practice of the invention, the following examples are included by way of illustration, and not by way of limitation.

EXAMPLES

The following resin formulations were prepared in order to test the improvement of the present invention:

|  | parts by weight |
|---|---|
| Resin A |  |
| tetra(4,4')N—glycidyl methylene dianiline (Ciba Geigy Araldite ® MY-720) | 80 |
| polyglycidyl ether of ortho-cresol formaldehyde novolac (Ciba Geigy ECN-1273) | 20 |
| diaminodiphenyl sulfone (Ciba Geigy Eporal ® HT-976) | 35 |
| fumed silica (SiO₂) (Cabot Cab-o-Sil ® M-5) | 6 |
| reaction product of toluene diisocyanate and dimethylamine | 1 |
| Resin B |  |
| tetra(4,4')N—glycidyl methylene dianiline (Ciba Geigy Araldite ® MY-720) | 80 |
| tetraglycidoxy tetraphenylethane (Shell Epon ® 1031) | 20 |
| trimethylene glycol di-para-amino-benzoate | 44 |
| fumed silica (SiO₂) (Cabot Cab-o-Sil ® M-5) | 6 |
| reaction product of toluene diisocyanate and dimethylamine | 1 |

Resin C (interleaf resin)

An interleaf resin composition was prepared according to the following formulation.

The following pre-mix was charged to a vessel and prepared in situ at 300° F. for four hours:

| PART A | parts by weight |
|---|---|
| carboxylic-functional butadiene/acrylonitrile polymer (Goodyear Hycar ® 1472) | 12 |
| diglycidyl ether of tetrabromo bisphenol A (Dow DER ® 542) | 65 |
| diglycidyl ether of bisphenol A (Dow DER ® 331) | 65 |
| bisphenol A | 2 |
| triphenyl phosphine | 0.1 |
| diaminodiphenyl sulfone (Ciba Geigy Eporal ® HT-976) | 6.0 |

The pre-mix, or "prereact", was then charged to a vessel with the following additional ingredients:

|  | parts by weight |
|---|---|
| prereact (Part A) | 150.1 |
| Part B |  |
| tetra(4,4')N—glycidylmethylene dianiline | 36.0 |
| diaminodiphenyl sulfone | 16.0 |
| dicyandiamide (American Cyanamid) | 8.0 |
| carboxylic-functional butadiene-acrylonitrile polymer | 12.0 |
| titanium dioxide | 1.0 |
| Amaplast yellow, dye | 0.05 |
| Green 2 Base, dye | 0.05 |

Fiber resin matrix prepreg fabrics were prepared by coating the above formulations on high-strength reinforcing fabric woven from 3,000 filament count tows of CELION ® high-strain graphite fiber (Celanese Plastics and Speciality Company), forming a fabric approximately 0.007 inch thick, having approximately 7 to 8 tows per inch. The fabric was coated to have a resin content of about 40%–45% by weight. In samples where an interleaf layer was included, the interleaf resin composition (Resin C) was applied in amounts between about 0.01 to 0.03 pounds per square foot (psf). In samples where a supporting non-woven fibrous mat was included, the mat was composed of Reemay 2105 lightweight spun polyester fiber, formed on a screen from a fibrous slurry. The mats weighed approximately .003 pounds per square foot (psf) and are similar to the gauzy supports used with film adhesives. Such mats added about 3–4% to the weight of the composites.

A series of fiber resin matrix composite samples using graphite fabric were prepared from matrix resins A and B, interleaf resin C, and the Reemay 2105 mat. Prepreg fabric sheets were formed into 18-ply laminates, the orientation of the fabric weave being alternated according to the same quasi-isotropic pattern, and the 18-ply laminates were then autoclave cured two hours at 350° F. and 100 psi pressure. The cured composites were cut into 4"×6" panels and tested for compression strength after falling dart impact. The following results were observed:

TABLE I

| Sample | Compression Strength (ksi) after 1500 in.-lb./in. Impact | | | Mean (± Standard Deviation) |
|---|---|---|---|---|
| Resin A | 29.5 | 29.59 | | 30.72 |
| (40% resin content) | 33.3 | 30.51 | | (± 1.78) |
| Resin A with .011 psf | 30.9 | | | 29.65 |
| Resin C Interleaf | 28.4 | | | (± 1.77) |
| Resin B | 29.6 | 30.5 | 32.9 | 31.46 |
| (40.5% resin content) | 33.0 | 29.2 | 33.59 | (± 1.92) |
| Resin B with .0174 psf | 34.6 | 32.6 | | 32.22 |

TABLE I-continued

| Sample | Compression Strength (ksi) after 1500 in.-lb./in. Impact | | Mean (± Standard Deviation) |
|---|---|---|---|
| Resin C Interleaf | 30.2 | 31.5 | (± 1.86) |
| Resin B with .028 psf | 30.3 | | 29.75 |
| Resin C Interleaf | 29.2 | | (± 0.78) |
| Resin B with .013 psf | 38.71 | 38.83 | 36.76 |
| Resin C + .003 psf fibrous mat | 35.16 | 34.36 | (± 2.34) |
| Resin B with .017 psf | 37.31 | 41.22 | 39.62 |
| Resin C + .003 psf fibrous mat | 36.55 | 43.40 | (± 3.24) |
| Resin B with .021 psf | 32.17 | | 34.99 |
| Resin C + .003 psf fibrous mat | 37.81 | | (± 3.99) |
| Resin A with .017 psf | 38.9 | | 38.3 |
| Resin C + .003 psf fibrous mat | 37.7 | | (± 0.85) |

A direct comparison of a Resin A composite, a Resin B composite and an interleafed composite according to the present invention using the fiber resin matrix with Resin B and the mat-supported interleaf layer using Resin C was also performed. 12-ply composites were tested for compression strength (warp) at room temperature, 200° F. and 200° F. after immersion of the test panel in 160° F. water for two weeks. 18-ply panels were subjected to compression strength after impact (1500 in.-lb./in. impact energy). Resin A and Resin B laminates were prepared from 40% resin content prepreg fabric; interleafed Resin B/Resin C laminates were prepared from 45% resin content prepreg. The following results were observed

TABLE II

| | Resin A | Resin B | Interleafed Composite |
|---|---|---|---|
| Compression Strength after 1500 in.-lb./in. impact (ksi) | 29.50 | 32.26 | 39.62 |
| Compression Strength (warp)(ksi), | | | |
| at room temp. | 103.5 | 108.3 | 100.4 |
| at 200° F. | 89.3 | 88.0 | 79.0 |
| at 200° F., wet* | 70.8 | 63.0 | 61.9 |

*wet = sample immersed in water at 160° F. for two weeks.

Many variations of the invention will suggest themselves to those skilled in this art in light of the above detailed description, and all such obvious variations are within the full intended scope of this invention. For example, other reinforcing filaments, such as carbon, silicon carbide, boron, aramide, polyester, polyamide, and rayon, or metal-coated, such as nickel- and/or silver-coated such filaments and fibers, alone or in any combination, can be used. Alternative supporting filaments for the lightweight fibrous mat or carrier may also be used, including glass, graphite, polyaramide, etc.

Matrix resin and interleaf resin formulations also can be varied in weight ratio widely, depending on the precise properties desired and the intended use. By way of illustration, where the preferred embodiment of the examples is used, the preferred weight ratios are as follows:

| Matrix Resin | | Parts by Weight | |
|---|---|---|---|
| | | Preferred | Most Preferred |
| (i) | tetra(4,4')N—glycidyl dianiline | 50-100 | 75-85 |
| (ii) | tetraglycidoxy tetra- | 0-50 | 15-25 |

| Matrix Resin | | Parts by Weight | |
|---|---|---|---|
| | | Preferred | Most Preferred |
| | phenylethane | | |
| (iii) | trimethylene glycol di-para-aminobenzoate | 28-60 | 35-45 |
| (iv) | fumed silica | 0-12 | 5-7 |
| (v) | reaction product of toluene diisocyanate and dimethylamine | 0.1-2.5 | 0.1-2.5 |

The interleaf resin, Parts A and B likewise can be mixed in broad ranges, but preferably, and most preferably the weights of ingredients used will fall in the following ranges:

| | | Parts by Weight | |
|---|---|---|---|
| | | Preferred | Most Preferred |
| Interleaf, PART A | | | |
| (i) | a carboxylic-functional butadiene-acrylonitrile copolymer | 6-18 | 10-15 |
| (ii) | diglycidyl ether of tetrabromobisphenol A | 0-130 | 55-75 |
| (iii) | diglycidyl ether of bisphenol A | 0-130 | 55-75 |
| (iv) | bisphenol A | 1-6 | 1-3 |
| (v) | triphenyl phosphine | 0.05-0.25 | 0.05-0.15 |
| (vi) | diaminodiphenyl sulfone | 2-12 | 3-9 |
| Interleaf, PART B | | | |
| (i) | tetra(4,4')N—glycidyl methylenedianiline | 25-50 | 30-40 |
| (ii) | diaminodiphenyl sulfone | 10-30 | 10-20 |
| (iii) | dicyandiamide | 2-12 | 5-10 |
| (iv) | a carboxylic functional butadiene-acrylontrile copolymer | 6-18 | 10-15 |
| (v) | titanium dioxide | 0.5-1.5 | 0.05-1.5 |

Wide proportions of Part A to Part B can be used, but preferably, from 75 to 200 parts by weight of Part A will be present for each 100 parts by weight of Part B. All such obvious variations are within the full intended scope of the invention as defined by the appended claims.

What is claimed is:

1. A method for producing an interleafed fiber resin matrix prepreg fabric comprising
    (1) incorporating a non-woven or woven fibrous mat or carrier of lightweight supporting filaments into an interleaf resin composition comprising (a) a first thermosetting epoxy resin composition containing (b) about 8% to 70% by weight of a rubbery vinyl addition polymer to provide a supported interleaf resin layer; and (2) introducing said supported interleaf resin layer to at least one surface of a fiber resin matrix comprising (a) a fabric of high-strength reinforcing filaments and (b) a second thermosetting epoxy resin composition coating and impregnating said fabric.

2. The method of claim 1, wherein said first thermosetting epoxy resin composition exhibits shear modulus of at least 50,000 psi and yield strength of at least 3,000 psi at high temperatures, and shear strain to failure of at least 6% at −67° F. and at least 15% at room temperature; and said second thermosetting epoxy resin composition exhibits shear modulus of at least 90,000 psi at high temperatures or at least 50,000 psi at high temperatures under wet conditions.

3. The method of claim 1, wherein said supporting filaments are selected from the group consisting of lightweight glass, carbon, graphite, polyaramide, polyester, and cellulosic filaments.

4. The method of claim 1, wherein said fabric is comprised of interwoven tows containing from about 1,000 to 12,000 high-strength reinforcing filaments.

5. The method of claim 4, wherein said reinforcing filaments are selected from the group consisting of glass, carbon, graphite, silicon carbide, boron, polyaramide, polyester, polyamide, rayon, polybenzimidazole, and polybenzothiazole filaments, and metal-coated such filaments.

6. The method of claim 1, wherein said rubbery vinyl addition polymer comprises about 8% to 24% by weight of said interleaf resin composition, said second thermosetting epoxy resin composition comprises about 35% to 60% by weight of said fiber resin matrix, and said fibrous mat or carrier comprises less than 5% by weight of the interleafed fiber resin matrix prepreg fabric.

7. The method of claim 6, wherein a cross-linked interface is formed between said interleaf resin layer and said fiber resin matrix.

8. The method of claim 1, wherein said first and second thermosetting epoxy resin compositions are, independently, comprised of epoxy compounds selected from the group consisting of polyglycidyl ethers of polyfunctional phenols, polyglycidyl ethers of the chlorination or bromination products of polyvalent phenols, polyglycidyl ethers of novolacs, polyepoxy compounds derived from aromatic amines and epichlorohydrin, and mixtures thereof.

9. The method of claim 2, wherein said first and second thermosetting epoxy resin compositions both exhibit an ultimate shear stress above about 3,000 psi.

10. The method of claim 8, wherein said epoxy resin compositions further include curing agents 11. The method of claim 10, wherein said curing agents are diamines.

12. The method of claim 11, wherein said diamines are selected from the group consisting of diaminodiphenyl sulphone, diaminodiphenyl methane, and phenylenediamine.

13. The method of claim 1, wherein said rubbery vinyl addition polymer is a homopolymeric or copolymeric diene rubber derived from a conjugated diene having 4 to 8 carbon atoms.

14. The method of claim 13, wherein said vinyl addition polymer is a butadiene-acrylonitrile polymer or a carboxcylic-functional butadiene acrylonitrile polymer.

15. In a method for producing an interleafed fiber resin matrix prepreg comprising (A) a fiber resin matrix comprising (i) a fabric of interwoven high-strength reinforcing filaments coated and impregnated with (ii) a thermosetting epoxy resin composition, and (B) a discrete interleaf resin layer on at least one surface of said fiber resin matrix comprising (i) a thermosetting epoxy resin composition and (ii) about 8% to 70% by weight of a rubbery vinyl addition polymer, the improvement which comprises incorporating a fibrous mat or carrier of lightweight supporting filaments into said interleaf resin layer.

16. An interleafed fiber resin matrix prepreg fabric comprising (A) a fiber resin matrix comprising (i) 40% to 70% by weight high-strength filaments interwoven to form a reinforcing fabric, and (ii) 30% to 60% by weight of a first thermosetting epoxy resin composition coating said fabric, said first epoxy resin composition comprising (a) a polyepoxide compound or combination of polyepoxide compounds, and (b) a curing agent effective to catalyze polymerization of said polyepoxide compound; and (B) a discrete interleaf resin layer comprising (i) a non-woven or woven fibrous mat or carrier of lightweight supporting filaments, and (ii) a second thermosetting epoxy resin composition coating said non-woven or woven fibrous mat or carrier, said second epoxy resin composition comprising (a) a polyepoxide compound or a combination of polyepoxide compounds, (b) about 8% to 70% by weight of a rubbery vinyl addition polymer, and (c) a curing agent affective to catalyze polymerization of said polyepoxide compound.

17. The prepreg fabric of claim 16, wherein said first thermosetting epoxy resin composition exhibits shear modulus of at least 50,000 psi and yield strength of at least 3,000 psi at high temperatures, and shear strain to failure of at least 6% at −67° F. and at least 15% at room temperature; and said second thermosetting epoxy resin composition exhibits shear modulus of at least 90,000 psi at high temperatures or at least 50,000 psi at high temperatures under wet conditions.

18. The pregreg fabric of claim 16, wherein said supporting filaments are selected from the group consisting of lightweight glass, carbon, graphite, polyaramide, polyester, and cellulosic filaments.

19. The pregreg fabric of claims 16, wherein said fabric is comprised of interwoven tows containing from about 1,000 to 12,000 high-strength reinforcing filaments.

20. The pregreg fabric of claim 19, wherein said reinforcing filaments are selected from the group consisting of glass, carbon, graphite, silicon carbide, boron, polyaramide, polyamide, rayon, polybenzimidazole, and polybenzothiazole filaments, and metal-coated such filaments.

21. The pregreg fabric of claim 20, wherein said rubbery vinyl addition polymer comprises about 8% to 24% by weight of said interleaf resin composition, said second thermosetting epoxy resin composition comprises about 30% to 60% by weight of said fiber resin matrix, and said non-woven or woven fibrous mat or carrier comprises less than 5% by weight of the interleafed fiber resin matrix prepreg fabric.

22. The prepreg fabric of claim 16, wherein a cross-linked interface is formed between said interleaf resin layer and said fiber resin matrix.

23. The prepreg fabric of claim 16, wherein said first and second thermosetting epoxy resin compositions are, independently, comprised of epoxy compounds selected from the group consisting of polyglycidyl ethers of polyfunctional phenols, polyglycidyl ethers of the chlorination or bromination products of polyvalent phenols, polyglycidyl ethers of novolacs, polyepoxy compounds derived from aromatic amines and epichlorohydrin, and mixtures thereof.

24. The prepreg fabric of claim 17, wherein said first and second thermosetting epoxy resin compositions both exhibit an ultimate shear stress above about 3,000 psi.

25. The prepreg fabric of claim 23, wherein said epoxy resin compositions further include curing agents.

26. The prepreg fabric of claim 25, wherein said curing agents are diamines.

27. The prepreg fabric of claim 26, wherein said diamines are selected from the group consisting of diaminodiphenyl sulphone, diaminodiphenyl methane, and phenylenediamine.

28. The prepreg fabric of claim 16, wherein said rubbery vinyl addition polymer is a homopolymeric or copolymeric diene rubber derived from a conjugated diene having 4 to 8 carbon atoms.

29. The prepreg fabric of claim 28, wherein said vinyl addition polymer is a butadiene-acrylonitrile polymer or a carboxcylic-functional butadieneacrylonitrile polymer.

* * * * *